United States Patent [19]

Wolff et al.

[11] Patent Number: 4,702,744

[45] Date of Patent: Oct. 27, 1987

[54] PROCESS FOR THE PREPARATION OF CONCENTRATED SOLUTIONS OF ANIONIC DYESTUFFS AND DYESTUFF ADDITIVES BY CATION EXCHANGE WITH CATION EXCHANGE RESIN

[75] Inventors: Joachim Wolff, Bergisch Gladbach; Jochen Koll, Odenthal; Karlheinz Wolf, Leverkusen; Reinhold M. Klipper, Cologne; Peter M. Lange, Leverkusen, all of Fed. Rep. of Germany

[73] Assignee: Bayer Aktiengesellschaft, Leverkusen, Fed. Rep. of Germany

[21] Appl. No.: 867,855

[22] Filed: May 27, 1986

[30] Foreign Application Priority Data

Jun. 13, 1985 [DE] Fed. Rep. of Germany ....... 3521129

[51] Int. Cl.$^4$ .................. C09B 67/24; C09B 69/02
[52] U.S. Cl. ............................ 8/527; 8/543; 8/549; 8/620; 8/676; 8/680; 8/681; 8/937; 210/660; 210/681; 210/661
[58] Field of Search .................. 8/527, 543, 549, 620, 8/680

[56] References Cited

U.S. PATENT DOCUMENTS

| | | | |
|---|---|---|---|
| 4,163,012 | 7/1979 | Kramer et al. | 534/784 |
| 4,336,026 | 6/1982 | Lacroix | 8/527 |
| 4,523,924 | 6/1985 | Lacroix | 8/527 |
| 4,560,480 | 12/1985 | Lacroix et al. | 210/638 |

FOREIGN PATENT DOCUMENTS

| | | |
|---|---|---|
| 87703 | 9/1983 | European Pat. Off. |
| 2015018 | 9/1979 | United Kingdom. |

*Primary Examiner*—A. Lionel Clingman
*Attorney, Agent, or Firm*—Sprung Horn Kramer & Woods

[57] ABSTRACT

Stable, concentrated aqueous solutions of, in particular, anionic reactive dyestuffs are obtained in a comparatively simple manner by freeing from salts, preferably by means of membrane separation processes, solutions of these substances just as they are obtained in the course of synthesis, and by replacing, with the aid of ion exchangers, the cations which cause sparing solubility.

19 Claims, No Drawings

PROCESS FOR THE PREPARATION OF CONCENTRATED SOLUTIONS OF ANIONIC DYESTUFFS AND DYESTUFF ADDITIVES BY CATION EXCHANGE WITH CATION EXCHANGE RESIN

The invention relates to a process for the preparation of concentrated aqueous solutions by anionic dyestuffs and anionic dyestuff additives, using, as the starting material, solutions or dispersions of these substances containing $\leq 5$ percent by weight, preferably $\leq 2$ percent by weight, of salts by replacing the cations which cause sparing solubility by cations which improve solubility, without intermediate isolation of the free acids on which the dyestuffs or additives are based.

The solutions or dispersions of low salt content which are employed as the starting materials are obtained, for example, by removing a large part of the interfering salts by selecting suitable reaction conditions—for instance by precipitation reactions—when the dyestuff or additive is synthesized (See, for example, DE-A No. 2,451,257).

Another possible method consists in precipitating the dyestuff or the additive and extracting the salts by washing (see, for example DE-A No. 3,207,534).

It is preferable, however, to use solutions or dispersions just as they are obtained in the customary production process, which have been freed from the salt burden by a membrane separation process, for example ultrafiltration.

Processes of this type have been described relatively often in the literature.

For example, solutions of Na and K salts of water-soluble reactive dyestuffs are substantially freed from Ca and Mg salts by membrane separation processes in accordance with EP-A No. 114,031, and certain buffer substances are added.

In the example mentioned, the reaction dyestuffs are in the form of $Na^{\oplus}$ salts before and after the membrane separation process. The starting materials used are synthesis solutions or dyestuff press cakes which have been isolated via NaCl and KCl. Even after the removal of the inert salts present in these materials and the addition of solubilizers such as $\epsilon$-caprolactam, urea and the like, highly concentrated solutions, stable under cold conditions, of the $Na^+$ reactive dyestuffs are often not obtained. Particularly in the case of prolonged storage under cold conditions ($+5°$ to $-5°$ C.), undesired precipitates of dyestuffs are formed, and these can only be caused to redissolve by stirring and at room temperature.

A process in which the inorganic salts are removed from the crude dyestuff solutions by dialysis and pressure permeation with the aid of ion exchange membranes, and are replaced by lithium or ammonium salts is disclosed in DE-A No. 2,805,891 (corresponding to GB-A No. 2,015,018). However, owing to the high requirement of demineralized water and of the readily soluble salts mentioned above, this process is not very economical.

Finally, a membrane separation process which uses so-called Donnan dialysis in order to carry out the cation exchange in order to convert the sparingly soluble dye salts into more readily soluble salts is described in EP-A No. 126,830. A disadvantageous factor in this process is the low space/time yield (according to the examples, the duration of the process is between 72 and 96 hours).

The object of the present invention was, therefore, to prepare concentrated aqueous solutions, stable on storage, of the active compounds mentioned, preferably selected reactive dyestuffs, without the disadvantages mentioned above.

This is achieved in accordance with the invention wholly or at least in part by carrying out the cation exchange by means of ion exchange resins in the form of pearls or granules (beads in English) which are insoluble in the reaction medium.

It must be regarded as decidedly surprising that this process takes place smoothly and without problems, since it could have been expected that the free dye acids would be precipitated in the columns packed with the exchange resins and that the reactive dyestuffs which are preferably employed would be hydrolyzed when using resins having a strongly acid reaction.

Treatment of the crude solutions of active compounds with the ion exchangers can, in principle, be carried out in any desired sequence, that is to say either before or after the removal of salts.

It is preferable, however, to remove the salts by means of membrane separation processes before the ion exchange treatment and the subsequent increase in concentration.

Examples of suitable membrane separation processes are reverse osmosis and, above all, ultrafiltration. The membranes to be employed in these processes are generally known and are listed, for example, in Ullmann's "Encyclopädie der technischen Chemie" (Encyclopaedia of Industrial Chemistry"), 4th edition, Volume 16, page 515 (Verlag Chemie Weinheim/New York, 1978). In addition, special ionic membranes such as are described, for example, in EP-A No. 82,355, EP-A No. 25,973, EP-A No. 61,424 and are suitable. Membranes which can be used particularly preferentially are pore membranes containing ionic groups, preferably in the form of dyestuff molecules.

These membranes preferably consist of polyamide, polysulphone, polystyrene or polyvinylidene fluoride and copolymers thereof.

Pore membranes are to be understood as membranes having an average pore diameter of about 20 Å–1 $\mu$m, preferably 20–500 Å.

The ionic membranes to be employed in accordance with the invention, in particular those in which amino groups have been modified with reactive dyestuffs, exhibit in ultrafiltration a high retention of dyestuffs and, at the same time, an excellent permeate flow for solvents and, in particular, inorganic salts, such as NaCl or $Na_2SO_4$.

The membrane separation process can be carried out in any conventional equipment. The shape of the membrane or of the module is immaterial. In general, the following membrane or module shapes can be employed: hollow fibres, hollow fine fibres, tubular membranes, coiled modules, plate-frame modules and many others in addition.

The pressures to be applied depend on the requirements of the particular module and the particular membrane. The pressures are preferably between 5 and 60 bar.

Suitable ion exchangers are synthetic organic ion exchangers which are based on synthetic resins, carry acid groups and are preferably prepared in bead form. These include commercial macroporous or gel-like bead polymers based on crosslinked polystyrene in which the styrene nuclei are substituted by sulphonic acid groups or —CH$_2$SO$_3$H groups. The crosslinking agents employed for styrene or substituted styrenes are polyvinylaromatic compounds, and divinylbenzene is preferred in this respect. Bead polymers based on polystyrene in which the styrene nuclei can be substituted by the following group are also suitable:

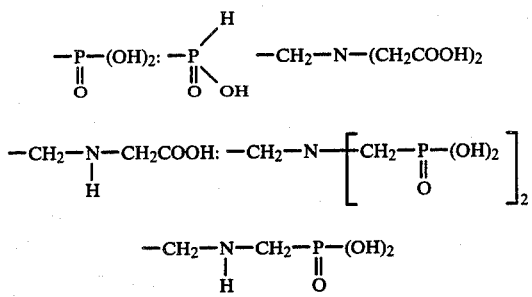

Further suitable cation exchangers are those containing —COOH groups. These include cation exchangers based on crosslinked acrylic acid or crosslinked methacrylic acid and crosslinked and subsequently saponified maleic anhydride. The crosslinking agents employed are vinyl aromatic compounds (preferably divinylbenzene, trivinylcyclohexene, 1,7-octadiene and 1,5-hexadiene and mixtures thereof).

Solid ion exchangers having acid groups, which have been prepared by condensation reactions are also suitable. These include cation exchangers based on phenol or phenol derivatives which have been subjected to a condensation reaction with formaldehyde. Strongly acid cation exchangers containing sulphonic acid groups are formed by subjecting aromatic compounds sulphonated on the nucleus (phenolsulphonic acid or naphthalenesulphonic acid) to a condensation reaction with formaldehyde. It is also possible to prepafre resins containing —CH$_2$—SO$_3$H groups and based on phenol by a simultaneous reaction of HCHO, sodium sulphite and phenol.

Condensation resins containing carboxyl groups are prepared by reacting HCHO with, for example, 1,3,5-resorcylic acid or by reacting HCHO with phenoxyacetic acid, resorcinol-O-acetic acid or analogous compounds.

Weakly acid resins which have been prepared by subjecting phenol or resorcinol to a condensation reaction with formaldehyde are also suitable. In addition to the synthetic organic ion exchangers, it is also possible to employ inorganic cation exchangers as solid acids. These include, in particular, the large class of the zeolite minerals or the class of the Glauconites (greensands). The zeolites include, inter alia, mordenite (Ca, K$_2$, Na$_2$) [AlSi$_5$O$_{12}$]$_2$.6.6H$_2$O and natrolith Na$_2$[Si$_3$Al$_2$O$_{10}$].2 H$_2$O. Natural inorganic ion exchangers or artificially prepared inorganic ion exchangers can be employed.

Cation exchangers of the type mentioned are described in large numbers in commerce and in the literature, see, for example, Ullmann's "Encyclopäpie der tech. Chemie" ("Encyclopaedia of Industrial Chemistry"), 4th edition, Volume 13, pages 279–346.

Suitable anionic dyestuffs are, in principle, all types provided that they contain groups imparting solubility in water. They can belong to a very wide variety of classes, for example to the series of metal-free or metal-containing monozao or polyazo dyestuffs, metal-free or metal-containing azaporphin dyestuffs, such as copper, cobalt or nickel phthalocyanine dyestuffs, anthraquinone, oxazine, dioxazine, triphenylmethane, nitro, azomethine or metal-free or metal-containing formazen dyestuffs.

These dyestuffs are described, for example, in the "Colour Index" 3rd edition, Volume 1, pages 1001 to 1562.

As the group imparting solubility in water, the anionic dyestuffs contain, for example, one or more COOH groups, but preferably SO$_3$H groups or salts thereof; anionic brighteners are also suitable.

Reactive dyestuffs are to be understood as meaning dyestuffs which contain one or more reactive groups or removable substituents which are capable, when the dyestuffs are applied to cellulose materials in the presence of acid-binding agents and, if appropriate, with the application of heat, of reacting with the formation of covalent bonds with the hydroxyl groups of the cellulose or, when application is made to superpolyamide fibres, such as wool, with the HN groups of these fibres.

Suitable reactive groups containing at least one removable substituent attached to a heterocyclic radical are, inter alia, those containing at least one reactive substituent attached to a 5-membered or 6-membered heterocyclic ring, such as a monazine, diazine, triazine ring, for example pyridine, pyrimidine, pyridazine, thiazine, oxazine or an asymmetrical or symmetrical triazine ring, or a ring system of the type which contains one or more fused rings, such as a quinoline, phthalazine, cinnoline, quinazoline, quinoxaline, acridine, phenazine or phenanthridine ring system; the 5-membered or 6-membered heterocyclic rings containing at least one reactive substituent are, accordingly, rings of the type which contain one or more nitrogen atoms and can contain 5-membered or preferably 6-membered carbocyclic rings in a fused arrangement.

Amongst the reactive substituents on the heterocyclic structure, the following examples should be mentioned: halogen (Cl, Br or F), Azido-(N$_3$), thiocyanato, thio, thioether and oxyether.

In the case of the present invention, reactive dyestuffs containing reactive groups based on the following systems are preferred: monohalogeno or dihlaogeno symmetrical triazinyl radicals, mono-, di- or trihalogenopyrimidinyl radicals or halogen-substituted quinoxalinylcarbonyl radicals.

Preferred reactive groups are those of the formulae

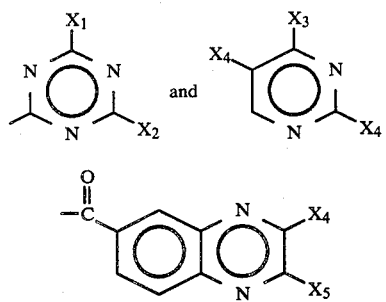

wherein
X$_1$=F
X$_2$=Cl, F, NH$_2$, NHR, OR, CH$_2$R or SR
X$_3$=Cl, F or CH$_3$,
X$_4$=Cl or F, and $X_5$ = Cl, F or $CH_3$, R being alkyl (in particular $C_1$–$C_4$-alkyl which is optionally substituted by OH, $SO_3H$ or COOH), aryl (in particular phenyl which is optionally substituted by $SO_3H$, $C_1$–$C_4$-alkyl or $C_1$–$C_4$-alkoxy) or aralkyl (in particular benzyl which is optionally substituted by $SO_3H$, $C_1$–$C_4$-alkyl or $C_1$–$C_4$-alkoxy).

Dyestuffs containing the abovementioned reactive group systems are disclosed, for example, in the following publications: U.S. Pat. No. 3,377,336, U.S. Pat. No. 3,527,760, GB-A No. 1,169,254, U.S. Pat. No. 3,669,951, DE-B No. 1,644,208, GB-A No. 1,188,606, DE-A No. 2,817,780, ES-A No. 479,771.

Amongst the non-tereocyclic reactive radicals the following are examples which should be mentioned: β-chloroethylsulphonyl, β-acetoxyethylsulphonyl, β-sulphatoethylsulphonyl, β-thiosulphatoethylsulphonyl, β-sulphatoethylsulphonylmethylamino and vinylsulphonylmethylamino groups.

The reactive dyestuffs can also contain combinations of two reactive radicals.

The following are suitable anionic dyestuff additives: in particular, anionic dispersing agents, the following may be mentioned as examples: alkali metal ligninsulphonate, condensation products formed from phenols, formaldehydes and sulphites, sulphosuccinic acid derivatives or condensation products formed from aromatic sulphonic acids and formaldehyde, such as, for example, naphthalenesulphonic acids, ditolyl ether-sulphonic acids or terphenylsulphonic acids with formaldehyde.

In accordance with a preferred process variant, a salt-containing solution of anionic dyestuffs or dyestuff additives having a concentration of active compounds of 1–15, preferably 3–10, % by weight is freed from salt to <1% by weight of inorganic salts via a membrane separation process, and the retentate is then passed over the exchange resin for the purpose of cation exchange and is neutralized with a base which denates cations serving to improve the solubility (for example LiOH, $Li_2CO_3$, ammonia, amines and/or alkanolamines). Thereafter, if desired, a further concentration of the solution of dyestuff or dispersing agent can be carried out.

In the cation exchange, it is appropriate not to replace the ions causing sparing solubility (in general $Na^\oplus$) quantitatively by the ions which improve solubility (for example $Li^\oplus$). It has been found, on the contrary, that the solutions which have optimum stability on storage are those in which mixed salts of the active compounds at an $Li^\oplus/Na^\oplus$ molar ratio of 3:1 to 1:3, preferably approximately 1:1, are present.

The concentrated liquid formulations which can be obtained by th process according to the invention generally have the following composition:
- 7–35% by weight of anionic dyestuff or additive,
- 0–30% by weight of water-miscible organic compounds which increase solubility and/or other customary additives,
- 0–5% by weight of inorganic salts, preferably 212% by weight,
- 0–5% by weight of buffer substances, remainder:water.

Preferred process products are solutions of reactive dyestuffs having an $Na^\oplus/Li^\oplus$ ratio of the type mentioned above.

The following may be mentioned as examples of water-miscible organic compounds which increse solubility: ethoxylated ammonium compounds, lower aliphatic or cyclic amides, preferably ε-caprolactam and N-methylpyrrolidone, and/or lower aliphatic sulphoxides and/or sulphur-containing compounds such as dimethyl sulphone, diethyl sulphone, sulpholane, sulpholene and derivatives thereof substituted in the α-position and/or β-position and/or hydrotropic compounds, such as thiourea and urea and derivatives thereof. N,N'-Dimethylurea is particularly preferred. If non-reactive dyestuffs are used, mixtures with amines, such as, for example, triethylamine, triethanolamine and similar derivatives, and also mixtures with glycols and ethers thereof can also be employed.

Nonionic surfactants, such as long-chain oxyethylated amines, alcohols and phenols, and inorganic or organic acids, such as, for example, formic acid, methanesulphonic acid, acetic acid, citric acid or lactic acid, are also suitable as additives.

If the solutions contain solid products as additives which increase concentration, they can be brought into a dry state, for example by spray drying, in a customary manner, if appropriate after the addition of customary standardizing agents. Powder or granule formulations of low salt content and improved solubility are obtained thereby.

Suitable standardizing agents are customary standardizing agents, that is to say solid compounds which do not enter into a reaction with the reactive group, such as, for example, polyphosphates, preferably, however, nonelectrolytes, such as polyvinylpyrrolidone or urea, salts of a water-soluble aromatic sulphonic acid, such as benzenesulphonic acid, and anionic dispersing agents, such as sulphated primary or secondary aliphatic alcohols having 10 to 18 carbon atoms, sulphated fatty acid amides, sulphated alkyleneoxy adducts, sulphated partially esterified polyhydric alcohols and, above all, sulphonates, such as long-chain alkylsulphonates, for example laurylsulphonate, stearylsulphonates, Mersolates, sodium dialkylsulphosuccinates, such as sodium dioctylsulphosuccinate, and taurides, for example oleylmethyltauride (sodium salt), alkylarylsulphonates, such as alkylbenzenesulphonates having a linear or branched alkyl chain of 7 to 20 carbon atoms, and monoalkylnaphthalenesulphonates and dialkylnaphthalenesulphonates, such as nonylbenzenesulphonate, dodecylbenzenesulphonate and hexadecylbenzenesulphonate and also 1-isopropylnaphthalene-2-sulphonate, diisopropylnaphthalenesulphonate and, in particular, condensation products formed from aromatic sulphonic acids and formaldehyde, such as naphthalenesulphonic acids, ditolyl ethersulphonic acids or terphenylsulphonic acid with formaldehyde and/or condensation products formed from cyclohexanone, formaldehyde and bisulphite, and/or ligninsulphonates. It is also possible to add customary anti-dust agents, such as oils, oil-/emulsifier mixtures or phthalic acid esters.

The products obtained by the process according to the invention are used for many purposes, for example for the preparation of dyebaths or printing pastes for dyeing natural and synthetic substrates, in particular cotton, wool, regenerated cellulose, paper and leather.

The concentrated solutions of mixed salts of anionic dyestuffs (preferably reactive dyestuffs) or dyestuff additives which can be obtained by the process according to the invention and which afre virtually free from extenders (that is to say containing less than 2% by weight) are new and therefore also form a subject of this invention.

Mixed salts of this type preferably correspond to the general formula $$[A]^{m\ominus} B_r{}^{n\oplus} D_p{}^{\oplus}$$

wherein
A denotes the anion of a dyestuff or additive,
B denotes Na, K, Ca or mixtures thereof,
D denotes H, Li, $NZ_3$ or $NZ_4$,
Z denotes H or optionally substituted alkyl,
m denotes an integer from 1 to 6,
r/p denotes an integer from 1 to 5, $p+r\cdot n=m$, and
n denotes 1 or 2.

Preferably, A represents the anion of a reactive dyestuff, B represents Na, and D represents $NZ_3$, $NZ_4$ and especially Li.

Suitable alkyl radicals z are $C_1$–$C_4$-alkyl radicals which can be substituted by OH, $C_1$–$C_4$-alkoxy or —(E—O)$_q$—Z′, wherein e denotes alkylene (for example $C_2H_4$), Z′ denotes H (or $C_1$–$C_4$-alkyl) and q denotes 2–10.

Compared with the dyestuff preparations disclosed in GB-A No. 1,318,111, which consist essentially of the Na salt of a reactive dyestuff and an inorganic Li salt as extender, the mixed salts according to the invention are distinguished by improved stability on storage of the concentrated aqueous solutions prepared from them.

EXAMPLE 1

1,140 g of a press cake containing 35% by weight of reactive dyestuff of the formula (1)

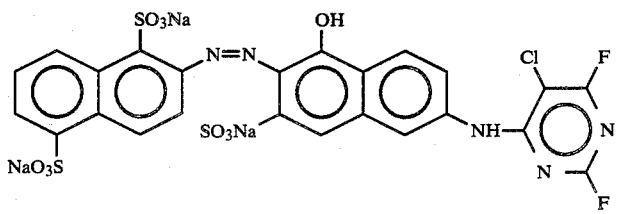

and 15% by weight of NaCl are dissolved in 8,860 g of water. 20 l of virtually dyestuff-free permeate containing salt are extracted continuously in the course of 150 minutes from this solution at room temperature and 40 bar on a laboratory pressure permeation device having 0.36 m² of a membrane composed of an aromatic polysulphone derivative having a separation limit of approximately 8,000 molecular weight, 20 l of distilled water being added. The 10 l of retentate solution containing 4% of reactive dyestuff (1) are then poured over a column packed with 1.5 l of a strongly acid, crosslinked polystyrene cation exchanger. After neutralization with LiOH.H₂O, 7.9 l of dyestuff-free permeate are again extracted from the solution on the laboratory pressure permeation device. After 110 g of ε-caprolactam has been added, a solution is obtained which is stable on storage even under cold conditions and which contains 18% by weight of the reactive dyestuff of the formula (2) in the form of a "Na⁺/Li⁺ mixed salt".

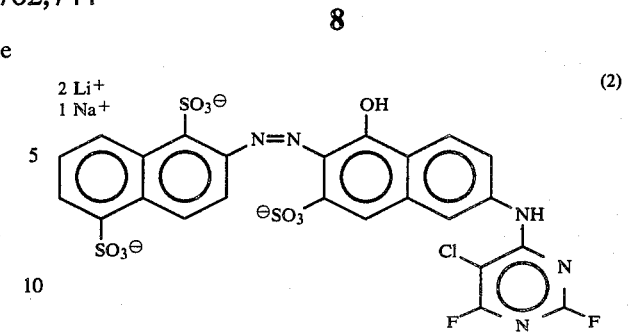

After the auxiliaries customary for reactive dyeing have been added, cotton can be dyed in a known manner with this solution.

EXAMPLE 2

The procedure is as in Example 1, but the starting solution contains 3% of reactive dyestuff of the formula (3)

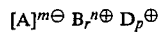

1.5% by weight of dicyandiamide and 1.5% by weight of NaCl. The amount of cation exchanger is 1 l. After the replacement of cations by H⊕, the mixture is neutralized with LiOH.H₂O and concentrated to 3 l. The addition of 45 g of dicyandiamide and 10 g of borate buffer gives a solution which is stable on storage and contains 10% by weight of reactive dyestuff of the formula (4).

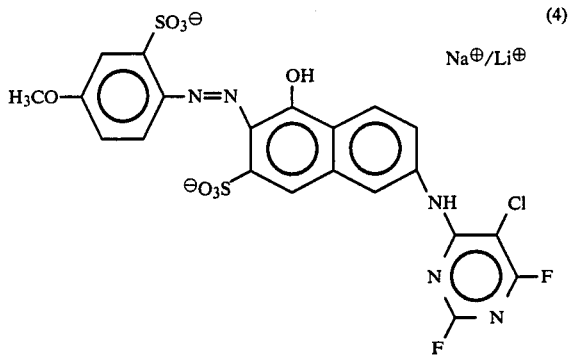

(4)

EXAMPLES 3-10

The procedure is as in Example 1, but the starting solutions used contain 3% of the dyestuffs (5)–(12) and also approximately 2% of NaCl. 1.5 l of the cation exchanger are employed. After the replacement by H⊕, the mixture is neutralized with LiOH.H₂O and concentrated. The addition of the solubilizers listed in Table 1 and 0.5% by weight of borate buffer gives solutions which are stable on storage in all cases, even under cold conditions, of the reactive dyestuffs, which are now in the form of Na⊕/Li⊕ mixed salts.

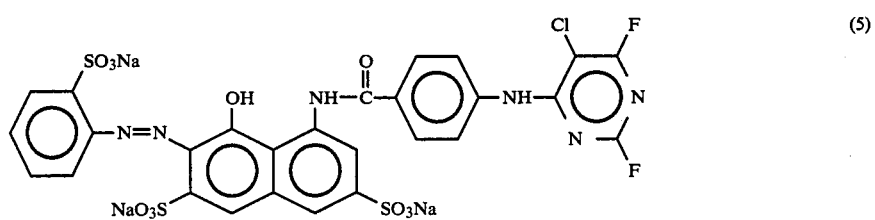

(5)

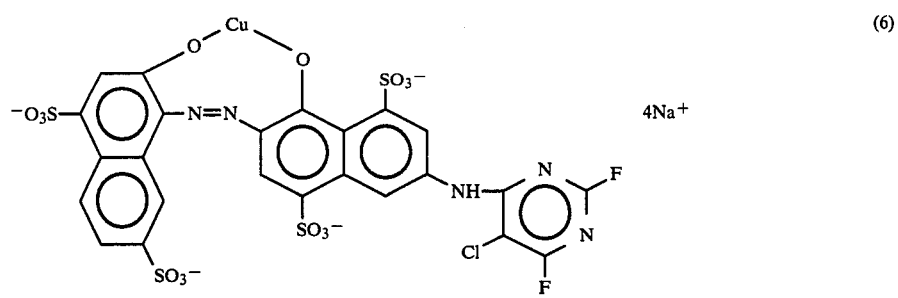

(6)

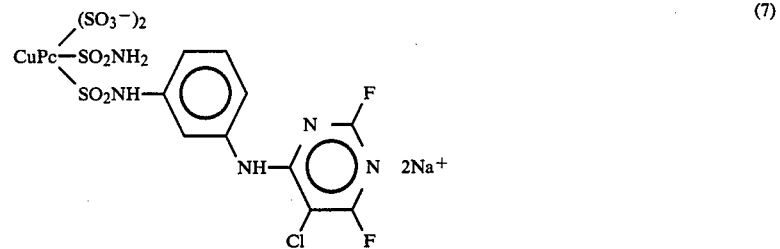

(7)

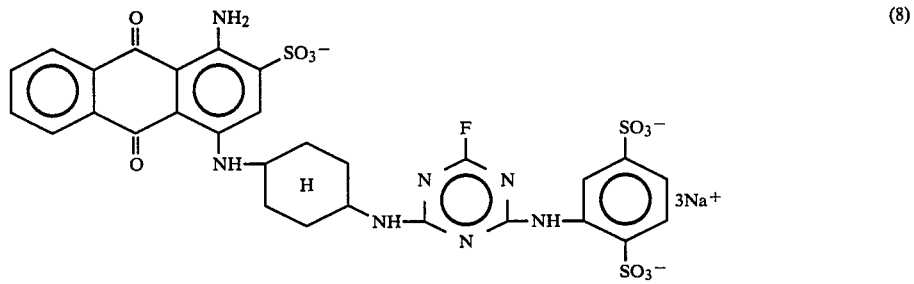

(8)

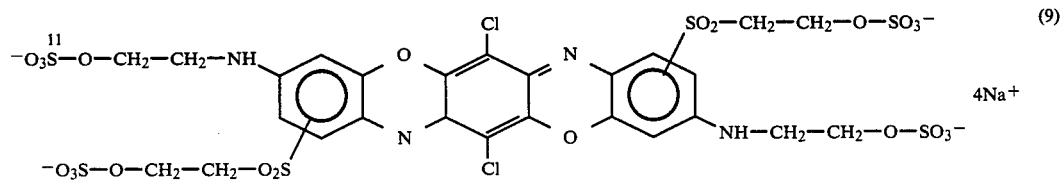

(9)

-continued

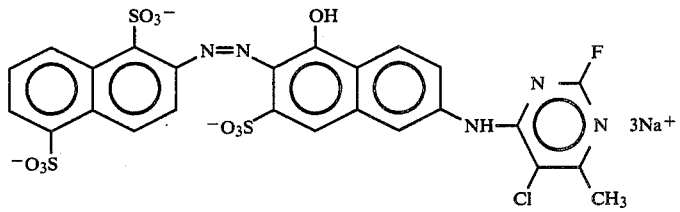
(10)

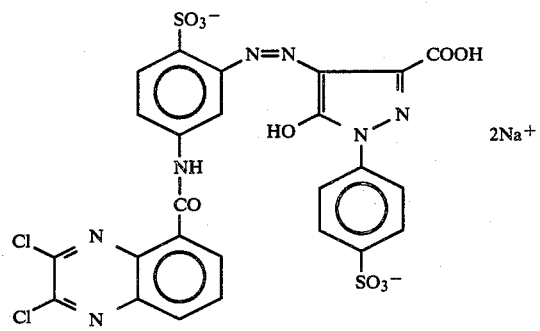
(11)

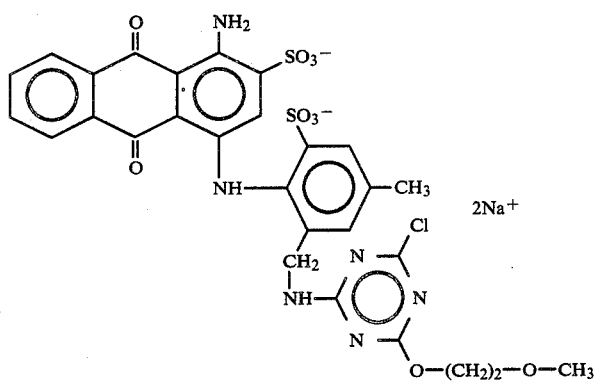
(12)

TABLE 1

| Example | Dyestuff content | Solubilizer | Li⊕/Na⊕ |
|---|---|---|---|
| 3 | 12% | 15% of ε-caprolactam<br>3% of dicyandiamide | 1:1 |
| 4 | 11% | 20% of ε-caprolactam | 1:3 |
| 5 | 18% | 20% of ε-caprolactam | 1:1 |
| 6 | 15% | 15% of ε-caprolactam<br>3% of methylpyrrolidone | 2:1 |
| 7 | 10% | 3% of dicyandiamide | 1:1 |
| 8 | 15% | — | 2:1 |
| 9 | 20% | — | 1:1 |
| 10 | 20% | 20% of N,N'—dimethylurea | 1:1 |

EXAMPLES 11-20

The procedure is as in Example 1, but the membrane used is a polysulphone membrane according to EP-A No. 61,424. The compound (12) is used as the reactive dyestuff.

EXAMPLE 21

The procedure is as in Example 1, except that the starting solution contains 5% of reactive dyestuff of the formula (7), 16% of ε-caprolactam and 15% of NaCl. After salt removal and ion exchange, the solution is concentrated to 20% of dyestuff. After the addition of 10% of ε-caprolactam and 0.5% of borate buffer, the resulting liquid preparation is stable on storage for a period of months.

EXAMPLE 22

1 l of a solution containing 3% by weight of reactive dyestuff of the formula (9), with a content of 10% of Ca ions and 90% of Na ions, 0.2% by weight of $CaSO_4$ and 0.5% by weight of $Na_2SO_4$, is poured over a column packed with 0.3 l of a strongly acid, crosslinked polystyrene cation exchanger. After being neutralized to pH 5 with $LiOH.H_2O$, the dyestuff solution can be freed from salts on a laboratory pressure permeation device according to Example 1 by means of 3 l of demineralized water, and can be concentrated to a dyestuff content of approximately 12% by weight.

EXAMPLE 23

10 l of a solution containing 2% by weight of dyestuff of the formula (13)

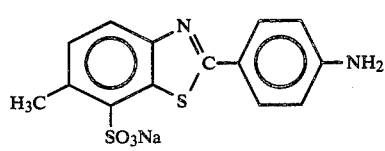
(13)

and 1.5% by weight of NaCl are freed from salts on a laboratory pressure permeation device according to Example 1 by means of 20 l of demineralized water, and are passed through a column packed with 1.5 l of strongly acid polystyrene cation exchange resin. The solution is then neutralized with a condensation product formed from triethanolamine and 3 moles of ethylene oxide. Concentration to 2 l gives a solution containing 10% by weight of dyestuff of the formula (14).

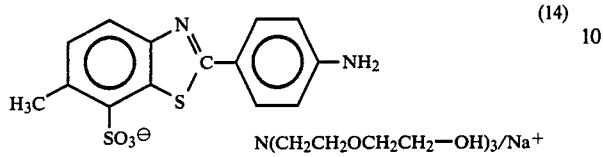

(14)

EXAMPLE 24

The procedure is as in Example 23, except that the starting solution contains 2% of dyestuff of the formula (15).

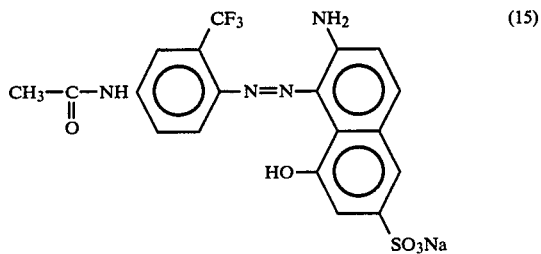

(15)

The salt-free dyestuff solution is neutralized in accordance with Example 23 and concentrated to 1 l and is then stabilized by the addition of 40% by weight of diethylene glycol monoethyl ether.

We claim:

1. A process for the preparation of concentrated aqueous solutions of anionic dyestuffs and anionic dispersing agents, using as starting materials solutions or dispersions of these substances having a salt content of $\leq 5$ percent by weight, comprising replacing $Na^\oplus$ ions of the dyestuff salts or the dispersing agent salts by $Li^\oplus$ and/or $NZ_3$, in which $Z=H$ or unsubstituted or substituted alkyl, without intermediate isolation of the free acids on which the dyestuffs or agents are based, wherein the cation exchange is carried out by means of cation exchangers in the form of pearls or granules which are insoluble in the reaction medium.

2. A process according to claim 1, wherein the starting materials used are solutions or dispersions which have been adjusted to said salt content by means of a membrane separation process.

3. A process according to claim 1, which further comprises the solutions of dispersions of low salt content which have been treated with the ion exchangers being concentrated by means of a membrane separation process.

4. Process according to claim 1, characterized in that the ion exchangers used are strongly acid resins based on polystyrenesulphonic acids or phenol/formaldehyde condensation products.

5. A process according to claim 2, wherein said membrane is a pore membrane composed of polysulphone, polyamide, polystyrene or polyvinylidene fluoride and containing ionic groups.

6. A process according to claim 1 wherein the Na ions of the dyestuff salts or dispersing agent salts are replaced by Li only to such an extent that an $Li^\oplus/Na^\oplus$ molar ratio of 3:1 to 1:3 is set up.

7. A process according to claim 1, wherein solutions of the composition comprise
7-35% by weight of an anionic dyestuff or dispersing agent,
0-30% by weight of a water-miscible organic compounds which increases solubility selected from the group consisting of ethoxylated ammonium compounds, lower aliphatic amides, cyclic amides, lower aliphatic sulphoxides, sulphones, thiourea, urea, urea derivatives, amines, glycols and glycol ethers, and/or other customary additives selected from the group consisting of non-ionic surfactants, inorganic acids, organic acids, standardizing agents and anti-dust agents,
0-5% by weight of inorganic salts,
0-5% by weight of buffer substances, with the remainder being water, are prepared.

8. Concentrated solutions which are virtually free from standardizing agents and contain mixed salts of the formula $$[A]^{m\ominus} B_r^\oplus D_p^\oplus$$

wherein
A denotes the anion of the dyestuff, or of a dispersing agent,
B denotes Na, K, Ca or mixtures thereof,
D denotes H, $NZ_3$, $NZ_4$ or Li,
Z denotes H or an unsubstituted or substituted alkyl,
m denotes an integer from 1 to 6,
r/p denotes an integer from 1 to 5, p+r·n being m, and
n denotes 1 or 2.

9. A process according to claim 1, wherein said salt content is $\leq 2$ percent by weight.

10. A process according to claim 1, wherein the ion exchangers are based on synthetic resins and carry acid groups.

11. A process according to claim 1, wherein the ion exchanger comprises crosslinked polystylene in which the styrene nuclei are substituted by sulphonic acid groups or $-CH_2SO_3H$ groups.

12. A process according to claim 7, wherein the water-miscible organic compound is selected from the group consisting of ε-caprolactam, N-methylpyrrolidone, dimethyl sulphone, diethyl sulphone, sulpholane, sulpholene, N,N'-dimethylurea, triethylamine and triethanolamine.

13. A process according to claim 7, wherein the non-ionic surfactant is selected from the group consisting of long-chain oxethylated amines, alcohols and phenols.

14. A process according to claim 7, wherein the standardizing agent is selected from the group consisting of polyphosphates, polyvinylpyrrolidone, urea, benzenesulphonic acid, sulphated primary aliphatic alcohols having 10 to 18 carbon atoms, sulphated fatty acid amines, sulphated alkyleneoxy adducts, sulphated partially esterified polyhydric alcohols, sulphonates, condensation products formed from aromatic sulphonic acids and formaldehyde, and condensation products formed from cyclohexanone, formaldehyde and bisulphite and/or ligninsulphonate.

15. A process according to claim 13, wherein said sulphonate is selected from the group consisting of laurylsulphonate, stearylsulphonate, Mersolate, sodium dioctylsulphosuccinate, oleylmethyltauride, nonylbenzenesulphonate, dodecylbenzenesulphonate, hexadecylbenzenesulphonate, 1-isopropylnaphtalene-2-sulphonate and diisopropylnaphthalenesulphonate.

16. A process according to claim 7, wherein the antidust agent is selected from the group consisting of oils, oil/emulsifier mixtures and phthalic acid esters.

17. A concentrated solution according to claim 8, wherein A is the anion of a reactive dyestuff, B is Na, D is Li, Z is H, $C_1$–$C_4$-alkyl, or $C_1$–$C_4$-alkyl substituted by OH or $C_1$–$C_4$-alkoxy.

18. A concentrated solution according to claim 8, wherein Z is an unsubstituted $C_1$–$C_4$-alkyl radical or a $C_1$–$C_4$-alkyl radical substituted by a substituent selected from the group consisting of OH, $C_1$–$C_4$-alkoxy and —(E—O)$_q$—Z' wherein E is alkylene, Z' is H or $C_1$–$C_4$-alkyl and q is 2 to 10.

19. A concentrated solution according to claim 18, wherein E is $C_2H_4$.

* * * * *

UNITED STATES PATENT AND TRADEMARK OFFICE
CERTIFICATE OF CORRECTION

PATENT NO. : 4,702,744
DATED : Oct. 27, 1987
INVENTOR(S) : Wolff et al.

It is certified that error appears in the above-identified patent and that said Letters Patent is hereby corrected as shown below:

Col. 3, line 68     Correct spelling of --monoazo--
Col. 5, line 39     Correct spelling of --donates--
Col. 5, line 60     Delete "212%" and substitute --<2%--
Col. 6, line 65     Delete "afre" and substitute --are--
Col. 7, line 19     Delete "e" and substitute --E--
Col. 14, line 59    Correct spelling of --amides--

Signed and Sealed this

Thirty-first Day of May, 1988

Attest:

DONALD J. QUIGG

Attesting Officer

Commissioner of Patents and Trademarks